T. T. PROSSER.
Connecting-Rods.
No. 145,752.                                Patented Dec. 23, 1873.
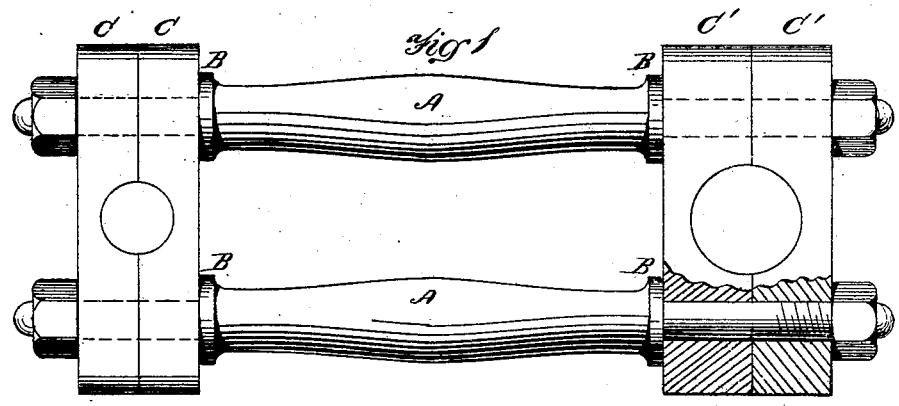
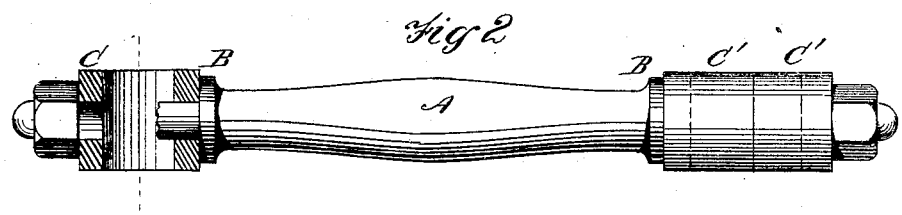
Witnesses
W. Bradford
F. R. Berthrong
T. T. Prosser
Inventor
D. V. Holloway & Co
Attys

UNITED STATES PATENT OFFICE.

TREAT T. PROSSER, OF CHICAGO, ILLINOIS.

IMPROVEMENT IN CONNECTING-RODS.

Specification forming part of Letters Patent No. 145,752, dated December 23, 1873; application filed July 21, 1873.

*To all whom it may concern:*

Be it known that I, TREAT T. PROSSER, of Chicago, in the county of Cook and State of Illinois, have invented certain new and useful Improvements in Connecting-Rods for Steam and other Engines, of which the following is a specification:

Figure 1 is a plan view of my improved rod, showing the two parallel rods with their nuts, and the boxes for the crank-pin and journal of cross-head, a portion of one pair of the boxes being broken away for the purpose of showing that part of the rod which passes through them; and Fig. 2 is a side view with a portion of one pair of the boxes broken away to show the aperture through them.

Corresponding letters denote corresponding parts in both figures.

This invention relates to connecting-rods for steam and other engines; and it consists in a novel construction of such rods, as will be more fully set forth hereinafter.

Connecting-rods of steam and other engines are frequently subjected to torsional strain, owing to the fact that the journals upon the cross-head and upon the crank or other device to which they are attached are not in line or parallel with each other.

The object of this invention is to provide a rod which, under such circumstances, shall be capable of having imparted to it an axial movement, for the purpose of relieving it to some extent of the torsional strain produced by the want of the proper alignment of the parts alluded to, and at the same time to provide for the ready adjustment of the boxes upon their journals.

In constructing rods of this character I use two parallel rods, A A, of the length and diameter required, they varying according to the capacity of the engine to which they are to be applied. These rods may be enlarged at their centers, as shown, or they may be of equal diameter throughout that portion of their length which is between the collars B B, of which there are two upon each rod, which are so placed that when the inner surfaces of the two boxes are brought in contact with them, the structure shall be of the required length from center to center of the apertures through said boxes, which are designed for the reception of the journals. That portion of the rods which is outside of the collars is somewhat reduced in diameter, they being of sufficient length to pass through the boxes and receive upon their outer ends nuts for holding said boxes in contact with the collars. Upon the outer ends of the rods A A there are placed at each end transverse pieces of metal, which constitute the boxes, they being so constructed as to allow the reduced portions of the rods to pass through them in a direction at a right angle to the apertures in their centers which receive the journals of the crank and cross-head. In order that these boxes, which are designated by the letters C C C' C', may be readily applied to the rods and to the journals upon which they are to work, they are made in two separate and equal parts, thus causing each box to separate at its center, so that it may be readily applied to crank-pins and other devices having collars upon each side of its journal or bearing. This form of construction also makes it convenient at any time to tighten them upon their journals, as, to do so, it is only necessary to remove the outer portions thereof, and dress off from their inner surface sufficient metal to allow them to fit snugly around said journals. Should it become necessary at any time to increase the distance between the boxes, a washer of metal or any other suitable substance may be placed between the collars upon the rods and the inner surfaces of said boxes, and thus the result will be accomplished.

From the foregoing, it will be apparent that such provision is made for an axial movement of the parts of the rod as will to a great extent relieve it from torsional strain, and thus to a great extent prevent the boxes from becoming heated and unduly warm by the friction caused by such strain.

Having thus described my invention, what I claim, and desire to secure by Letters Patent, is—

A connecting-rod composed of the parallel independent stay-rods A A and independent boxes C C C' C', the several sections of which are separately adjustable on the rods, substantially as and for the purpose specified.

In testimony whereof I have signed my name to this specification in the presence of two subscribing witnesses.

TREAT T. PROSSER.

Witnesses:
B. EDW. J. EILS,
WILMER BRADFORD.